(12) United States Patent
Bertolini et al.

(10) Patent No.: US 9,513,416 B2
(45) Date of Patent: Dec. 6, 2016

(54) PANE CONSTRUCTION (71) Applicant: ISOCLIMA S.p.A., Este (IT)

(72) Inventors: Alberto Bertolini, Este (IT); Guglielmo Macrelli, Este (IT)

(73) Assignee: ISOCLIMA S.P.A., Este (IT)

( * ) Notice: Subject to any disclaimer, the term of this patent is extended or adjusted under 35 U.S.C. 154(b) by 546 days.

(21) Appl. No.: 14/023,774

(22) Filed: Sep. 11, 2013

(65) Prior Publication Data
US 2014/0285879 A1 Sep. 25, 2014

(30) Foreign Application Priority Data

Mar. 25, 2013 (EP) ..................... 13425045

(51) Int. Cl.
*G02B 1/00* (2006.01)
*G02B 5/20* (2006.01)
*B32B 17/10* (2006.01)
*F41H 5/04* (2006.01)

(52) U.S. Cl.
CPC ......... *G02B 5/208* (2013.01); *B32B 17/10036* (2013.01); *B32B 17/1077* (2013.01); *B32B 17/10458* (2013.01); *B32B 17/10513* (2013.01); *F41H 5/0407* (2013.01); *B32B 2369/00* (2013.01)

(58) Field of Classification Search
None
See application file for complete search history.

(56) References Cited

U.S. PATENT DOCUMENTS

| 5,239,406 | A | * | 8/1993 | Lynam | B32B 17/10 296/215 |
| 5,496,643 | A | | 3/1996 | Von Alpen | |
| 6,055,088 | A | | 4/2000 | Fix et al. | |
| 6,136,225 | A | * | 10/2000 | Meyer | C07C 69/96 106/401 |
| 6,280,826 | B1 | * | 8/2001 | Woll | B32B 17/10045 109/49.5 |
| 6,800,337 | B1 | * | 10/2004 | Siemensmeyer | C03C 17/32 252/299.01 |
| 2003/0137632 | A1 | | 7/2003 | Kawabata | |
| 2005/0001456 | A1 | * | 1/2005 | Bohm | B32B 17/10018 296/215 |
| 2005/0221091 | A1 | * | 10/2005 | Parker | C03C 17/32 428/411.1 |
| 2005/0231336 | A1 | * | 10/2005 | Strohband | B32B 17/10532 340/426.27 |
| 2007/0109673 | A1 | | 5/2007 | Padiyath et al. | |
| 2007/0152188 | A1 | | 7/2007 | Silverman et al. | |
| 2008/0182041 | A1 | | 7/2008 | Sekine et al. | |

(Continued)

FOREIGN PATENT DOCUMENTS

DE 102010048097 A1 4/2012

*Primary Examiner* — Robert S Loewe
(74) *Attorney, Agent, or Firm* — Hauptman Ham, LLP (57) ABSTRACT

The present invention refers to a pane construction, particularly to be used in a motor vehicle, comprising transparent panes, layers and/or foils made of glass, ceramic, plastic or organic material, which are connected in a layered manner in a laminate, wherein the pane construction has transparent infrared (=IR) filtering layer means or a IR filtering foil for filtering of infrared (IR) radiation of the sunlight impinging the pane construction.

15 Claims, 2 Drawing Sheets

(56) References Cited

U.S. PATENT DOCUMENTS

| | | | |
|---|---|---|---|
| 2008/0231934 A1* | 9/2008 | Knafou | B60J 3/04 |
| | | | 359/245 |
| 2009/0115922 A1 | 5/2009 | Veerasamy | |
| 2012/0033287 A1* | 2/2012 | Friedman | C03C 17/34 |
| | | | 359/275 |
| 2012/0094118 A1 | 4/2012 | Oki et al. | |
| 2012/0202084 A1* | 8/2012 | Tamura | C03C 17/007 |
| | | | 428/480 |
| 2012/0307337 A1 | 12/2012 | Bartug et al. | |

* cited by examiner

PANE CONSTRUCTION

RELATED APPLICATIONS

The present application is based on, and claims priority from, European Application Number 13425045.5, filed Mar. 25, 2013, the disclosure of which is hereby incorporated by reference herein in its entirety.

The present invention refers to a pane construction that can be used in a motor driven vehicle according to the preamble of claim 1.

A pane construction is known, for instance, from EP 1010963 B1 describing bullet resistant windows as special kind of a pane construction. The transparent laminated bulletproof pane comprises several transparent panes or layers of glass or synthetic material which are connected with each other, wherein particularly one or several laminated layers of synthetic material like, for instance, polyurethane and polyvinyl butyral or other thermoplastic materials or foils are provided between the panes of glass, bulletproof glass or polycarbonate for forming the laminate.

If such a laminated pane construction is subjected to the natural sunlight over a longer time period of, for instance, a few years, the characteristics of the layers made of synthetic or plastics material being organic compounds can degrade. Particularly, the transparent layers made of synthetic material of the window may become more turbid or cloudy resulting in a degrading transparency for visible light. Further, a lasting radiation with natural sunlight can also result in an increasing brittleness of the layers made of plastic or other organic material degrading the strong lamination of the known pane construction.

It is, therefore, an object of the invention to provide a pane construction that reduces degrading of characteristics like becoming more turbid or brittleness.

This object is solved by the pane construction according to claim 1. Accordingly, the pane construction of the invention, particularly to be used in a motor vehicle, comprises transparent panes, layers and/or foils made of glass, ceramic, plastic or organic material, which are connected in a layered manner in a laminate, wherein the pane construction has transparent infrared (=IR) filtering layer means or an IR filtering foil for filtering of infrared radiation of the sunlight impinging the pane construction.

By filtering the IR radiation, the pane construction or window of the invention has the great advantage of preventing an excessive heating of the window by IR radiation, and, therefore, the pane construction of the invention advantageously avoids damage of plastic layers and other layers or panes comprising organic material like, for instance, an electrochromic layer, by heat resulting from IR radiation that would otherwise degrade the structure of the organic or plastic layers in the pane construction gradually. Accordingly, the life-time of the pane construction of the invention is high since gradually degrading, increasing brittleness and increasing turbid characteristics of the pane construction due to heating by IR radiation is substantially avoided by filtering the IR radiation.

The IR filtering means can absorb the IR radiation or preferably it is able to reflect the impinging IR radiation. Accordingly, the pane construction of the invention has preferably IR reflecting layer means or an IR reflecting foil for reflecting IR radiation impinging from outside on the pane construction or window. Only a part of the IR radiation or none of the IR radiation in best case can pass to the panes and layers of plastics or synthetic or organic material to reduce or even avoid negative aging effects of these layers like brittleness and cloudiness. The glass pane construction of the invention has the decisive advantage that the required transparency can be maintained due to the IR filtering means even over a long time period of usage.

The glass pane construction of the invention may have IR filtering layer means comprising one reflecting layer or several reflecting layers for reflecting IR radiation to ensure a very high degree of filtering IR radiation.

Preferably, the pane construction of the invention has a IR reflecting foil for reflecting IR radiation to facilitate the production of the pane construction due to easy handling and storage of the IR reflecting thermoplastic foil during production.

The IR filtering means and UV filtering means can be realized in the form of a combined IR and UV reflecting foil before laminating of the whole pane construction to facilitate the production even more.

The IR reflecting layer means or foil or the combined IR and UV reflecting foil of the pane construction of the invention can comprise at least one cholesteric layer that reflects IR radiation, wherein the cholesteric layer has at least one reflection maximum at an IR wavelength in a range between 750 and 2000 nm, or that the IR reflecting layer means or foil or the IR and UV reflecting foil comprises a plurality of cholesteric layers for reflecting IR radiation, wherein the cholesteric layers have different reflection maximums each at an IR wavelength in a range between 750 and 2000 nm to ensure a high degree of IR reflection or total IR reflection in the IR radiation wavelength range. Visible light between 400 to 750 nm is passed quite completely by the IR filter as required for use as vehicle window.

Preferably, the IR reflecting layer means or foil or the IR and UV reflecting foil comprises at least four cholesteric layers for reflecting IR radiation, wherein the first cholesteric layer has a reflection maximum at a wavelength of 943 nm, the second cholesteric layer has a reflection maximum at a wavelength of 1085 nm, the third reflection layer has a reflection maximum at a wavelength of 1250 nm, and the fourth cholesteric layer has a reflection maximum at a wavelength of 1440 nm to ensure reflection of IR radiation at the maximum IR radiation wavelengths.

Preferably, the pane construction of the invention can comprise UV filtering means or a UV filtering foil. The UV filtering means or foil can absorb the UV radiation or preferably it is able to reflect the impinging UV radiation. Accordingly, the pane construction of the invention has preferably UV reflecting layer means or an UV reflecting foil for reflecting UV radiation impinging from outside on the pane construction or window. Only a part of the UV radiation or none of the UV radiation in best case can pass to the panes and layers of plastics or synthetic or organic material to reduce or even avoid negative aging effects of these layers like brittleness and cloudiness. The glass pane construction of the invention has the advantage that the required transparency can be maintained due to the UV filtering means even over a long time period of usage.

The glass pane construction of the invention may have UV filtering layer means comprising one reflecting layer or several reflecting layers for reflecting UV radiation to ensure a very high degree of filtering UV radiation. Particularly, the UV filtering means comprises at least one or more cholesteric layers reflecting UV radiation.

Preferably, the pane construction of the invention has a UV reflecting transparent thermoplastic foil for reflecting UV radiation to facilitate the production of the pane construction due to easy handling and storage of the UV reflecting foil during production.

The IR filtering means and UV filtering means can be realized in the form of the combined IR and UV reflecting foil before laminating of the whole pane construction to facilitate the production even more.

Preferably, the UV filtering layer means or UV reflecting thermoplastic transparent foil works in a wavelength range of the electro magnetic UV radiation between approximately 300 and approximately 400 nm to be able to restrain such UV radiation. Visible light that is sun radiation in a range of wavelength between approximately 400 to 750 nm is passed quite completely by the UV filter as required for use as vehicle window.

Preferably, the UV filtering layer means is provided as a thermoplastic foil before laminating of the glass pane construction since this foil is quite easy to use. Further, the foil can be built in or integrated quite easily into the laminate of the security glass construction or bullet proof window like a thermoplastic foil being an intermediate layer of the laminate.

An outer pane of the glass pane construction according to the invention can consist of glass, vitreous ceramic or plastic wherein the IR filtering layer means can ad-join the outer pane directly. Preferably, the UV filtering layer means or UV reflecting foil adjoins the IR filtering layer means in a laminate in direction to an inside of the pane construction or vehicle in order to ensure protection of the subsequent layers of synthetic material or laminated layers against IR and UV radiation.

Preferably, the pane construction of the invention comprises electrochromic layer means or a corresponding electrochromic thermoplastic foil for controlling the transparency of the glass pane construction electrically.

An electrochromic light-damping device is described in DE 698 10 776 T2, wherein the function thereof is based on organic compounds. Also DE 10 2008 030 441 B3 describes a known electrochromic layered means that is called a light valve assembly and that is used in a glazing of vehicles. The known light valve assembly being electrically switchable comprises in a laminate two opposite substrate foils with electrically conductive electrodes mounted thereon and a light valve layer or electrochromic layer there between. The electrodes consist of inorganic materials like for example light transparent and conductive oxides. The substrate foils are made of synthetic material or plastic. The light valve layer comprises organic compounds or suspended valve drops that can be aligned in an electrical field that can be generated by supplying of an electrical voltage or AC voltage to the electrodes. If the light valve compounds of the electrochromic layer are aligned by supplying a voltage, the transparency of the light valve arrangement is high. If, in contrast, no voltage is applied to the light valve, the compounds are disordered in their alignment and the light transparency is only minimal.

It was found out that the required transparency of a glass pane construction with built-in electrochromic layered means degrades with time if the glass pane construction is exposed to natural sun light since its IR radiation and/or UV radiation could damage the organic compounds of the electrochromic layers.

The pane construction of the present invention having an electrochromic layer thus has the decisive advantage that the specified high transparency is maintained also within a long time period of use due to IR filtering means and/or UV filtering means. It was found out that it can be avoided due to the UV filtering layer or foil in the glass pane construction of the invention that the ultra violet radiation of the sunlight impinges onto the electrochromic layer. Accordingly, an interaction between the UV radiation and the organic and electrochromic compounds of the electrochromic layer can be avoided, which otherwise would lead to degrading of transparency of the electrochromic layer. It was also found out that it can be avoided due to the IR filtering layer or foil in the glass pane construction of the invention that the IR radiation of the sunlight impinges onto the electrochromic layer. Accordingly, heating of the organic and electrochromic compounds of the electrochromic layer can be avoided, which otherwise could lead to degrading of transparency of the electrochromic layer or even to a damage of the electrochromic layer.

The UV filtering layer means can be provided as a UV reflecting foil and/or the IR filtering layer means can be provided as an IR reflecting foil and/or the electrochromic layer means can be provided as an electrochromic foil or the UV filtering layer means and the IR filtering layer means can be provided in a single IR and UV reflecting transparent and thermoplastic foil or the IR filtering layer means and electrochromic layer means can be provided in a single IR reflecting and electrochromic foil or the UV filtering layer means and electrochromic layer means can be provided together in a single UV reflecting and electrochromic foil or the IR filtering layer means, the UV filtering layer means, and the electrochromic layer means can be provided together in a single IR and UV reflecting and electrochromic transparent and thermoplastic foil before laminating of the whole pane construction to facilitate the production of the pane construction.

Preferably, the IR filtering layer means and/or UV filtering layer means comprises at least one cholesteric layer having a cholesteric compound or component or a cholesteric mixture of compounds or components in cured state which are selected from:

at least one cholesteric polymerisable monomer;
at least one achiral, nematic polymerisable monomer and a chiral compound;
at least one cholesteric polymerisable polymer;
at least one cholesteric polymer in a polymerisable solvent;
at least one cholesteric polymer whose cholesteric face can be frozen in by rapid cooling to below the glass transition temperature; and/or
at least one achiral liquid/crystalline cross linkable polymer and achiral compound. These components are explained in detail in DE 197 45 647 A1.

The cholesteric layer is preferably designed to have a maximum of reflection at ultra violet wavelengths $\lambda$ in the range between approximately 300 to 400 nm. Particularly the cholesteric layer may have a maximum of reflection in ultra violet wavelength of approximately $\lambda=350$ nm whereby a secure decline of the ability of reflection in direction to the visible wavelengths range is enabled.

The IR filtering layer and/or UV filtering layer means may comprise in laminate a first cholesteric layer, a second cholesteric layer, and a $\lambda/2$ layer or $\lambda/2$ foil being arranged between the cholesteric layers, whereby the $\lambda/2$ layer reverses the circular polarisation of the impinging UV radiation and both cholesteric layers have unequal or equal pitch and/or unequal or equal handedness, preferably the same pitch and handedness to increase the ability of IR and/or UV reflection. The IR and/or UV reflection can even be considerably increased into a range of 80% or even more than 90%, wherein the light transparency of the UV filter amounts to even more than 90% in the visible range of spectrum.

Preferably a laminated layer sequence or corresponding thermoplastic foil may be realised of a UV filter layer means and an electrochromic layer means to facilitate the production of the laminated pane.

The layer sequence in the laminate made of the UV filtering layer means and electrochromic layer means may comprise a cholesteric layer, a thermoplastic layer, a first electrode layer, an electrochromic layer, and a second electrode layer to allow a compact construction.

The layered sequence of laminate consisting of UV filtering layer means and electrochromic layer means may comprise a first cholesteric layer, λ/2 layer or λ/2 foil, a second cholesteric layer, a thermoplastic layer, a first electrode layer, an electrochromic layer, and a second electrode layer, wherein the λ/2 layer reverses the circular polarisation of the impinging UV radiation and both cholesteric layers have the same pitch and handedness to obtain a facilitated production together with a very high UV reflection.

The substrate layers and the thermoplastic layers may consist respectively of a thermoplastic material like polyethylene terephtalate (PET), polymethyl methacrylate (PMMA), polycarbonate (PC), polyvinyl butyral (PVB) or ethylenevinyl acetate (EVA), or preferably polyurethane (PU) since they are available as foils.

Further advantageous embodiments of the present invention are mentioned in the subclaims.

Further advantages, advantageous embodiments, and utilisations of the invention could be taken from the following description of exemplified and preferred embodiments of the invention in connection with the drawings that show.

Figure 1:
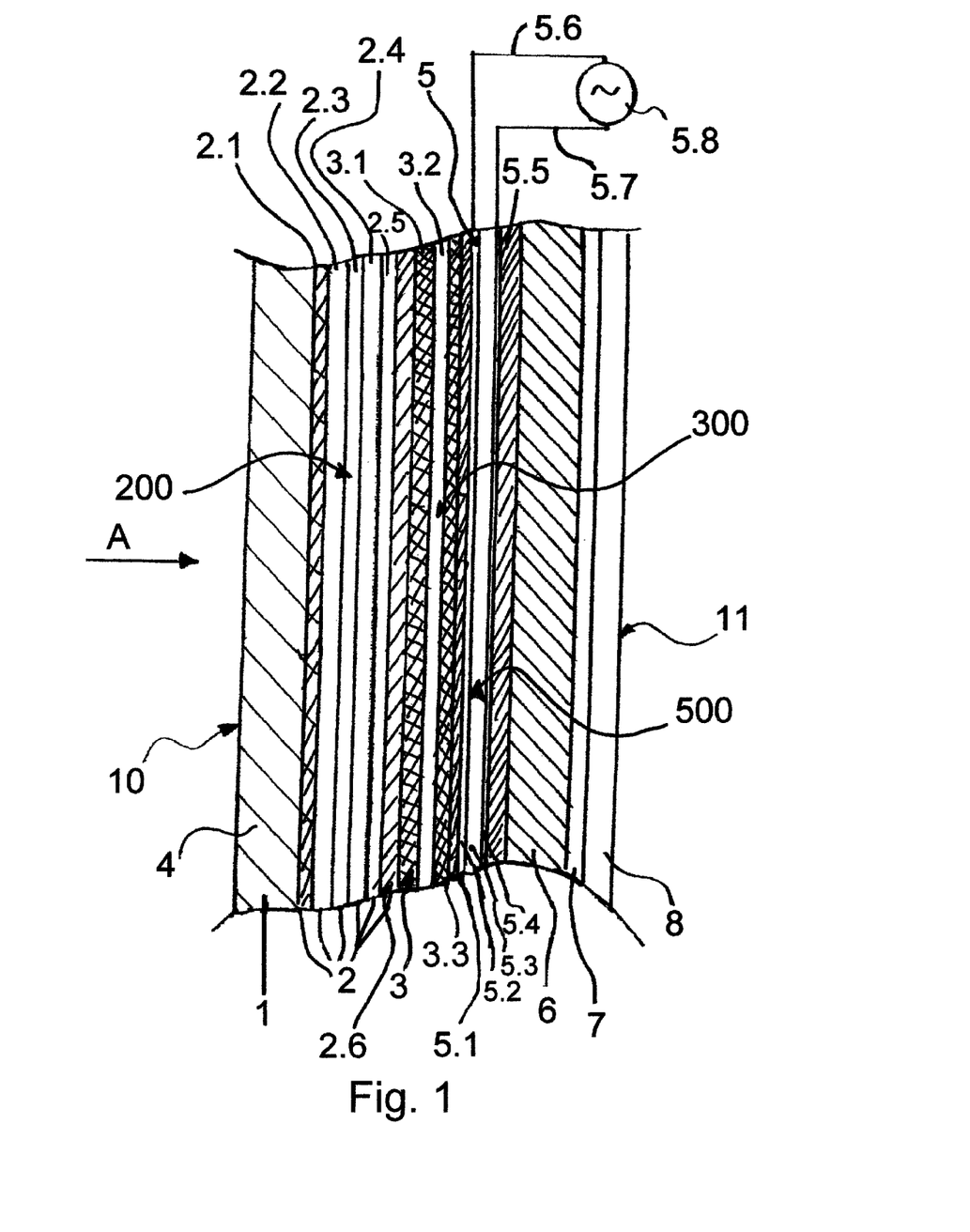
FIG. 1 a schematic partial section view of a pane construction of the invention according to an exemplified embodiment of the invention in the form of a bulletproof pane comprising infrared (=IR) reflecting layer means or foil, an ultraviolet (=UV) reflecting layer means or foil, and an electrochromic layer means.

FIG. 1 shows a schematic partial section view of a pane construction or window of the invention in an exemplified embodiment of the invention in the form of a bullet proof pane 1 or window which could be used preferably in a motor driven vehicle like a car etc., the pane construction 1 comprises electrochromic layer means 5, IR filtering layer means 2, and UV filtering layer means 3. The bullet proof pane 1 is a transparent and laminated pane.

The bullet proof pane 1 of the invention has an outer transparent pane 4 made of glass, plastic like, for instance, PC (=polycarbonate), or a glass ceramic at the outside of the vehicle and an inner transparent pane 6 made of glass or plastic like, for instance, PC (=polycarbonate), or glass ceramic. An outside face 10 of the bullet proof pane 1 and, therefore, the side of the vehicle onto which bullets could strike on is marked by the arrow A in FIG. 1 which is directed to the outer pane 4. The IR filtering layer means 2, the UV filtering layer means 3, and the electrochromic layer means 5 in this sequence, which are in a laminate to each other and to the panes 4 and 6, extend between the outer pane 4 and the inner pane 6.

The IR filtering layer means 2 is constructed by multiple layers and reflects infrared (=IR) radiation comprised in the spectrum of the natural sunlight which impinges on the outer surface 10 of the bullet proof pane 1 in the direction of the arrow A. Accordingly, the IR filtering layer means 2 represent IR reflecting layer means which could be realized in the form of an IR reflecting layered transparent thermoplastic foil 200 before laminating the whole bullet proof pane 1 or pane construction. The IR filtering layer means 2 adjoins the outer pane 4.

The UV filtering layer means 3 is constructed by multiple layers in a laminate and reflects ultra violet (=UV) radiation comprised in the spectrum of the natural sunlight which impinges on the outer surface 10 of the bullet proof pane 1 in the direction of the arrow A. Accordingly, the UV filtering layer means 3 represent UV reflecting layer means that could be realized in the form of a UV reflecting layered transparent thermoplastic foil 300 before laminating the whole bullet proof pane 1. The UV filtering layer means 3 adjoins the IR filtering layer means 2.

In alternative, the IR filtering layer means 2 and the UV filtering layer means 3 could be realized in the form of a single combined IR and UV reflecting layered and laminated transparent thermoplastic foil before laminating the whole bullet proof pane 1 in an autoclave.

The electrochromic layer means 5 is constructed also by multiple layers and it has again a transparency of light that can be controlled or switched by means of a voltage source 5.8 being applied, for instance, an AC voltage of 110 V. The electrochromic layer means 5 is identical in shape to the IR filtering layer means 2 and the UV filtering layer means 3 and it can be realized in the form of a laminated thermoplastic foil 500 before laminating the whole bullet proof pane 1.

On an inside surface of the inner pane 6, a layered sequence of a polyurethane layer 7 and of a polycarbonate layer 8 in this sequence can be arranged. Consequently, the bullet proof pane 1 has a layered and laminated construction seen from outside to inside comprising the pane 4, the IR filtering layer means 2 or foil 200, the UV filtering layer means 3 or foil 300, the electrochromic layer means 5 or foil 500, the inner pane 6, the polyurethane layer 7, and the polycarbonate layer 8. All these panes and layers have a high transparency for visible light and form together a laminate.

The UV filtering layer means 3 has an outer substrate layer 3.1 or thermoplastic foil, that adjoins the outer pane 2, an inner substrate layer 3.3, and a UV reflecting layer 3.2 arranged between the outer and inner substrate layers 3.1 and 3.3.

The UV reflecting layer 3.2 is a cholesteric layer that comprises a mixture or compound of a chiral component and a nematic component, wherein the chiral component has a concentration of approximately 0.031 in molar fraction or molar relation and the nematic component having a concentration of approximately 0.969 in molar fraction or molar relation. The wavelength of the reflection maximum of this mixture amounts to approximately 350 nm whereby high reflection ability is obtained in the UV radiation wavelength range from 300 nm up to 400 nm. The nematic component comprises a nematic monomer with a formula N1 and/or N2

-continued and/or N3

With R=H, $C_1$ or $CH_3$ and $n_1$ and $n_2$ are respectively 2, 4, 6, etc. in a preferred embodiment.

The chiral component comprises a compound with the formula C1 and/or

C2

The UV reflecting layer 3.2 may contain additional components like solvents, photo initiators, bonding agents, and levelling agents in small amounts.

Before the whole bullet proof pane 1 is produced as a laminate using heat and pressure in an autoclave, the UV filtering layer means 3 is produced as a foil 300.

During production, the cholesteric UV reflecting layer 3.2 having a thickness of 30 μm using a wet process is applied on the substrate layer 3.1 or foil made of thermoplastic polyurethane by using, for instance, a doctor blade. The cholesteric UV reflecting layer 3.2 contains a mixture comprising the nematic monomer of formula N1 and the chiral component of formula C1, wherein the concentration of the nematic monomer N1 amounts to approximately 0.969 in molar fraction and wherein the concentration of the chiral component C1 amounts to approximately 0.031 in molar fraction. Cellulose acetate butyral can be added to improve the building of the layer. Butyl acetate may be used as solvent. 2,4,6-trimethylbenzoyldiphenylphosphine oxide may be added to the mixture in small concentration as photo initiator. After applying the cholesteric mixture, a UV light source is used for radiating after the solvent was lost in order to obtain a curing of the layer. Then a further foil made of thermoplastic polyurethane for providing the substrate layer 3.3 is arranged on the UV reflecting layer 3.2 to prepare the foil 300 as UV filtering layer means 3.

Since the UV filtering layer means 3 reflects the UV radiation of the natural sunlight substantially, the UV radiation cannot pass to the subsequent layers 5, 7, and 8 of plastic or organic synthetic material whereby negative aging effects of these layers like increasing brittleness and cloudiness can be prevented.

The laminated IR filtering layer means 2 or IR reflecting foil 200 has a first outer substrate layer 2.1 made of, for instance, polyurethane or another thermoplastic foil, which adjoins the outer pane 4, four IR reflecting layers 2.2, 2.3, 2.4, and 2.5 laminated in this sequence on the first substrate layer 2.1, and a second substrate layer 2.6 or coating for covering the IR reflecting layers 2.2 to 2.5 and adjoining the UV filtering layer means 3.

Each of the IR reflecting layers 2.2, 2.3, 2.4, and 2.5 is a cholesteric layer that comprises a mixture or compound of a chiral component and a nematic component. The first IR reflecting layer 2.2 comprises a chiral component with a concentration of approximately 0.027 in molar fraction or molar relation and the nematic component having a concentration of approximately 0.973 in molar fraction. The wavelength of the reflection maximum of the IR reflecting layer 2.2 amounts to approximately 943 nm. The second IR reflecting layer 2.3 comprises a chiral component with a concentration of approximately 0.024 in molar fraction and the nematic component having a concentration of approximately 0.976 in molar fraction. The wavelength of the reflection maximum of the IR reflecting layer 2.3 amounts to approximately 1085 nm. The third IR reflecting layer 2.4 comprises a chiral component with a concentration of approximately 0.021 in molar fraction or molar relation and the nematic component having a concentration of approximately 0.979 in molar fraction. The wavelength of the reflection maximum of the IR reflecting layer 2.4 amounts to approximately 1250 nm. The fourth IR reflecting layer 2.5 comprises a chiral component with a concentration of approximately 0.018 in molar fraction or molar relation and the nematic component having a concentration of approximately 0.982 in molar fraction.

The wavelength of the reflection maximum of the IR reflecting layer 2.5 amounts to approximately 1440 nm. An additional fifth reflecting layer (not shown) could be used which comprises a chiral component with a concentration of approximately 0.032 in molar fraction or molar relation and a nematic component having a concentration of approximately 0.968 in molar fraction. The wavelength of the reflection maximum of the additional fifth reflecting layer could be approximately 220 nm.

The IR reflection layers 2.2 to 2.5 provide a high reflection ability in the IR radiation wavelength range from 750 nm up to 2000 nm. Each of the IR reflecting layers 2.2 to 2.5 has a nematic component comprising a nematic monomer with a formula N1 and/or N2 and/or N3, and a chiral component comprising a compound with the formula C1 and/or C2. Further, each of the IR reflecting layers 2.2 to 2.5 may contain additional components like solvents, photo initiators, bonding agents, and levelling agents in small amounts.

Before the whole bulletproof pane 1 is produced as a laminate using heat and pressure in an autoclave, the IR filtering layer means 2 is produced as a laminated transparent thermoplastic foil 200.

During production, the first cholesteric IR reflecting layer 2.2 having a thickness of 30 μm using a wet process is applied on the substrate layer 2.1 or foil made of thermoplastic polyurethane by using, for instance, a doctor blade. The first cholesteric IR reflecting layer 2.2 contains preferably a mixture comprising the nematic monomer of formula N1 and the chiral component of formula C1, wherein the concentration of the nematic monomer N1 amounts to approximately 0.973 in molar fraction and wherein the concentration of the chiral component C1 amounts to approximately 0.027 in molar fraction. Cellulose acetate butyral can be added to improve the building of the layer. Butyl acetate may be used as solvent. 2,4,6-trimethylbenzoyldiphenylphosphine oxide may be added to the mixture in small concentration as photo initiator. After applying the cholesteric mixture, a UV light source is used for radiating after the solvent was lost in order to obtain a curing of the layer.

Afterwards, the second cholesteric IR reflecting layer 2.3 having a thickness of 30 μm using a wet process is applied on the first cholesteric IR reflecting layer 2.2 using again the doctor blade. Also the second cholesteric IR reflecting layer 2.3 contains preferably a mixture comprising the nematic monomer of formula N1 and the chiral component of formula C1, wherein the concentration of the nematic monomer N1 amounts to approximately 0.976 in molar fraction and wherein the concentration of the chiral component C1 amounts to approximately 0.024 in molar fraction. Again, cellulose acetate butyral can be added to improve forming of the layer. Butyl acetate may be used as solvent. 2,4,6-trimethylbenzoyldiphenylphosphine oxide may be added to the mixture in small concentration as photo initiator. After applying the cholesteric mixture, a UV light source is used for radiating after the solvent was lost in order to obtain a curing of the IR reflecting layer 2.3.

The third cholesteric IR reflecting layer 2.4 having a thickness of 30 μm using the wet process is then applied on the second cholesteric IR reflecting layer 2.3 using again the doctor blade. Also the third cholesteric IR reflecting layer 2.4 contains preferably a mixture comprising the nematic monomer of formula N1 and the chiral component of formula C1, wherein the concentration of the nematic monomer N1 amounts to approximately 0.979 in molar fraction and wherein the concentration of the chiral component C1 amounts to approximately 0.021 in molar fraction. Again, cellulose acetate butyral can be added to improve forming of the layer. Butyl acetate may be used as solvent. 2,4,6-trimethylbenzoyldiphenylphosphine oxide may be added to the mixture in small concentration as photo initiator. After applying the cholesteric mixture, a UV light source is used for radiating after the solvent was lost in order to obtain a curing of the IR reflecting layer 2.4.

Afterwards, the fourth cholesteric IR reflecting layer 2.5 having a thickness of 30 μm using a wet process is applied on the third cholesteric IR reflecting layer 2.4 using again the doctor blade. Also the fourth cholesteric IR reflecting layer 2.5 contains preferably a mixture comprising the nematic monomer of formula N1 and the chiral component of formula C1, wherein the concentration of the nematic monomer N1 amounts to approximately 0.982 in molar fraction and wherein the concentration of the chiral component C1 amounts to approximately 0.018 in molar fraction. Again, cellulose acetate butyral can be added to improve the building of the layer. Butyl acetate may be used as solvent. 2,4,6-trimethylbenzoyldiphenylphosphine oxide may be added to the mixture in small concentration as photo initiator. After applying the cholesteric mixture, a UV light source is used for radiating after the solvent was lost in order to obtain a curing of the IR reflecting layer 2.5.

Then the second substrate layer 2.6 or foil made of thermoplastic polyurethane is arranged on the fourth IR reflecting layer 2.5 to prepare the foil 200 as IR filtering layer means 2.

The layers 2.1, 2.6, 3.1, and 3.3 can respectively consist of a thermoplastic material or foil material as, for instance, polyethylene terephtalate (PET), polymethyl methacrylate (PMMA), polycarbonate (PC), polyvinyl butyral (PVB), or ethylene-vinyl acetate (EVA), or preferably polyurethane (PU).

The thickness of the outer pane 4 can amount to 4 mm, and the thickness of the inner pane 6 may be 6 mm. The thickness of the substrate layers 2.1, 2.6, 3.1, and 3.3 may be 1 mm, respectively. The thickness of the polyurethane layer 7 may be 1.9 mm and the thickness of the polycarbonate layer 8 may be 2.5 mm.

The electrochromic layer means 5 comprises a first substrate layer 5.1, a first electrode layer 5.2, a second electrode layer 5.4, an electrochromic layer 5.3 arranged between the first electrode layer 5.1 and the second electrode layer 5.4, and a second substrate layer 5.5 in a laminate or electrochromic foil 500 in this sequence.

The substrate layers 5.1 and 5.5 can respectively consist of thermoplastic material or foil material as, for instance, polyethylene terephtalate (PET), polymethyl methacrylate (PMMA), polycarbonate (PC), polyvinyl butyral (PVB), or ethylene-vinyl acetate (EVA), or preferably polyurethane (PU). The electrode layers 5.2 and 5.4 contain, for instance, indium tin oxide. The electrochromic layer 5.3 comprises a light valve suspension as, for instance, it is described in DE 10 2008 030 441 B3 and DE 696 09 275 T2 or an electrochromic compound that, for instance, comprises 1,1'-dimethyl-4,4'-dipyridine diperchlorate, 2-terbutylanthraquinone and 5,10-hydro-5,10-dimethylphenazine in γ-butyrolactone with a light sensitive component as it is described in detail in DE 698 10 776 T2 together with further examples. The electrochromic layer 5.3 has a thickness of approximately 0.150 mm.

The electrochromic layer 5.3 is transparent for light in the visible spectral range of the sunlight if an electrical voltage is supplied from the voltage source 5.8 via electrical conductors 5.6 and 5.7 to the electrode layers 5.2 and 5.4, respectively. Conversely, the electrochromic layer 5.3 is getting non-transparent or opaque if no electrical voltage is supplied to the electrode layers 5.2 and 5.4. The electrochromic layer means 5 is provided preferably in the form of a laminated foil 500 at the beginning of the production of the bullet proof pane 1.

Figure 2:
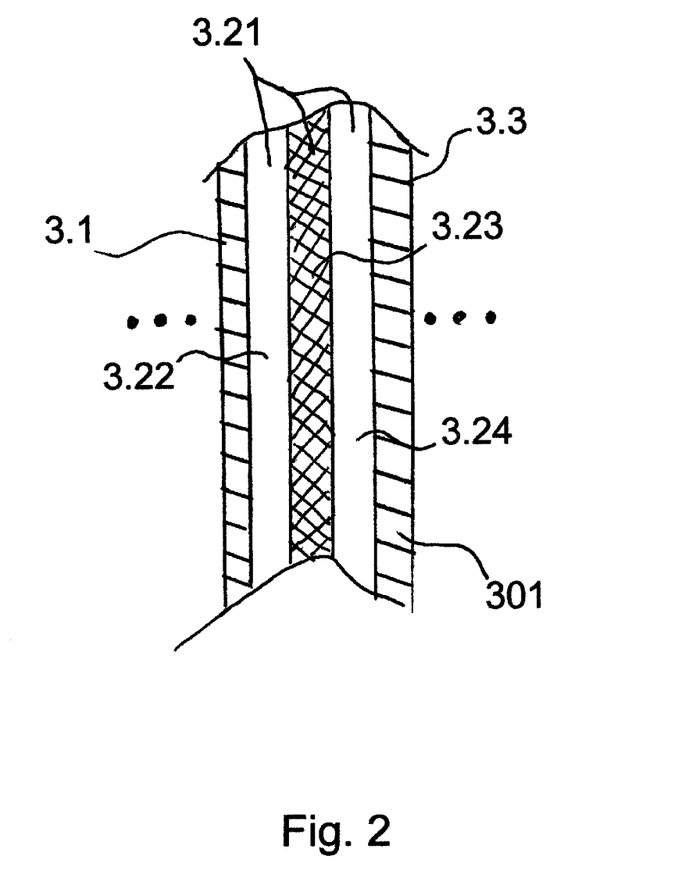
FIG. 2 a schematic partial view of an alternative UV reflecting layer means to be used in the embodiment of FIG. 1.

According to a first alternative embodiment of the invention, the cholesteric UV reflecting layer 3.2 of FIG. 1 is replaced by a UV reflecting layer 3.21 as shown in schematic detail in FIG. 2.

The alternative UV reflecting layer 3.21 of the UV reflecting layer means 3 comprises a first outer cholesteric layer 3.22 and a second inner cholesteric layer 3.24 each containing a mixture having a chiral component and a nematic component, and each having the same handedness and pitch, wherein the chiral component having a concentration of approximately 0.031 in molar fraction and the nematic component having a concentration of approximately 0.969 in molar fraction. The wavelength of the reflection maximum of this mixture amounts to approximately 350 nm whereby high reflection ability is obtained in the UV radiation wavelength range from 300 nm up to 400 nm. The nematic component comprises a nematic monomer having the formula N1 and/or N2 and/or N3 as it is described in detail with regard to FIG. 1. The chiral component comprises a compound having the formula C1 and/or C2. The cholesteric layers 3.22 and 3.24 respectively may contain additional components like solvents, photo initiators, bonding agents, and levelling agents in small amounts.

The UV reflecting layer 3.21 comprises a $\lambda/2$ foil 3.23 or $\lambda/2$ layer or $\lambda/2$ plate which is arranged between the first cholesteric layer 3.22 and the second cholesteric layer 3.24 in a laminated arrangement. The $\lambda/2$ foil 3.23 reverts the direction of circulation of the circular polarised UV radiation passing there through. This three layer construction of the UV reflecting layer 3.21 provides very high values of UV reflection between 80 and 90% and values of transmittance in the visible spectrum or light of more than 90%.

The UV filtering layer means 3 is produced as a UV reflecting foil 301 before the whole bullet proof pane 1 is laminated in an autoclave. During the production of the UV reflecting foil 301, the cholesteric layer 3.22 is applied in a thickness of 30 μm on the substrate layer 3.1 or foil made of thermoplastic polyurethane or another thermoplastic material being used as substrate by using, for instance, a doctor blade in a wet process. The cholesteric layer 3.22 contains a mixture comprising the nematic monomer of formula N1 and the chiral component of formula C1, wherein the concentration of the nematic monomer N1 amounts to approximately 0.969 in molar fraction and wherein the concentration of the chiral component C1 amounts to approximately 0.031 in molar fraction. Cellulose acetate butyral can be added. Butyl acetate can be used as a solvent. 2,4,6-trimethylbenzoyldiphenylphosphine oxide is added to the mixture in small concentration as photo initiator. After depositing the cholesteric mixture, a UV light source is used for radiating after the solvent was lost in order to obtain a curing of the layer.

Thereafter the $\lambda/2$ foil 3.23 is put on the first cholesteric layer 3.22.

The second cholesteric layer 3.24 is then applied in a thickness of 30 μm on the $\lambda/2$ foil 3.23 again by using, for instance, a doctor blade in a wet process. The second cholesteric layer 3.24 also contains a mixture comprising the nematic monomer of formula N1 and the chiral component C1 wherein also in this case the concentration of the nematic monomer N1 amounts to approximately 0.969 in molar fraction and wherein the concentration of the chiral component amounts to approximately 0.031 in molar fraction. Cellulose acetate butyral can be added to improve the forming of the layer. Butyl acetate can be used as solvent. 2,4,6-trimethylbenzoyldiphenylphosphine can be used as photo initiator in the mixture in small concentration.

After depositing of the second cholesteric layer 3.24, the second substrate layer 3.3 or foil made of thermoplastic polyurethane or another thermoplastic material is deposited on the second cholesteric layer 3.24 after escape of the solvent to produce the UV reflecting layer means 3 as a foil 301.

In a second alternative embodiment of the invention, before, for instance, the bullet proof pane 1 is produced and laminated in an autoclave, the IR filtering layer means 2 and the UV filtering layer means 3 can be prepared and provided as a single combined IR and UV reflecting foil without the adjoining substrate layers 2.6 and 3.1 of the embodiment of FIG. 1. The single combined IR and UV reflecting foil then can comprise the first substrate layer 2.1, the four IR reflecting layers 2.2, 2.3, 2.4, and 2.5, the UV reflecting layer 3.2 or the UV reflecting layer 3.21 of FIG. 2, and the second substrate layer 3.3. An additional cholesteric layer with a maximum reflection wavelength of 220 nm could be added.

In a third alternative embodiment of the invention, before, for instance, the bullet proof pane 1 is produced and laminated in an autoclave, the UV filtering layer means 3 and the electrochromic layer means 5 can be prepared and provided as a single combined UV reflecting and electrochromic foil without the substrate layer 3.3 and/or substrate layer 5.1 of the embodiment of FIG. 1. The single IR reflecting and electrochromic foil then can comprise the first substrate layer 3.1, the UV reflecting layer 3.2 or the UV reflecting layer unit 3.21, the second substrate layer 3.3 or the first substrate layer 5.1 or without the layers 3.3 and 5.1, the first and second electrode layers 5.2 and 5.4, the electrochromic layer 5.3, and the substrate layer 5.5. The additional cholesteric layer with a maximum reflection wavelength of 220 nm could be added.

In a fourth alternative embodiment of the invention, before, for instance, the bullet proof pane 1 is produced and laminated in an autoclave, the IR filtering layer means 2, the UV filtering layer means 3, and the electrochromic layer means 5 can be prepared and provided as a single combined IR and UV reflecting and electrochromic foil without the adjoining substrate layers 2.6 and 3.1 of the embodiment of FIG. 1. The single IR and UV reflecting and electrochromic foil then can comprise the first substrate layer 2.1, the four IR reflecting layers 2.2, 2.3, 2.4, and 2.5, the UV reflecting layer 3.2 or the UV reflecting layer 3.21, the second substrate layer 3.3 or the first substrate layer 5.1 or without the layers 3.3 and 5.1, the first and second electrode layers 5.2 and 5.4, the electrochromic layer 5.3, and the substrate layer 5.5. The additional cholesteric layer with the maximum reflection wavelength of 220 nm could be added.

The invention claimed is:

1. A pane construction to be used in a motor vehicle, the pane construction comprising transparent panes, layers and/or foils made of glass, ceramic, plastic or organic material, which are connected in a layered manner in a laminate, said laminate comprising:
   an outer pane made of glass, glass ceramic or plastic;
   a transparent infrared (IR) reflecting layer configured to reflect IR radiation of sunlight impinging on the pane construction;
   a transparent ultraviolet (UV) reflecting layer configured to reflect UV radiation of the sunlight impinging on the pane construction; and an electrically controllable or switchable electrochromic layer for electrical controlling or switching of the light transparency of the glass pane construction, wherein the UV reflecting layer comprises at least one cholesteric layer configured to reflect UV radiation, said cholesteric layer having at least one reflection maximum at an UV wavelength in a range between approximately 300 and 400 nm, and the IR reflecting layer is arranged between the UV reflecting layer and the outer pane.

2. The pane construction according to claim 1, wherein said laminate comprises a single combined IR and UV reflecting foil comprising the IR and UV reflecting layers.

3. The pane construction according to claim 1, wherein the IR reflecting layer comprises at least one cholesteric layer configured to reflect IR radiation, said cholesteric layer has at least one reflection maximum at an IR wavelength in a range between 750 and 2000 nm.

4. The pane construction according to claim 3, wherein the IR reflecting layer comprises at least first to fourth cholesteric layers configured to reflect IR radiation, the first cholesteric layer has a reflection maximum at a wavelength of 943 nm, the second cholesteric layer has a reflection maximum at a wavelength of 1085 nm, the third reflection layer has a reflection maximum at a wavelength of 1250 nm, and the fourth cholesteric layer has a reflection maximum at a wavelength of 1440 nm.

5. The pane construction according to claim 4, wherein at least one of the cholesteric layers comprises a mixture of a chiral component and a nematic component.

6. The pane construction according to claim 3, wherein the IR reflecting layer comprises a plurality of cholesteric layers configured to reflect IR radiation, and the plurality of cholesteric layers have different reflection maximums each at an IR wavelength in the range between 750 and 2000 nm.

7. The pane construction according to claim 1, wherein the UV reflecting layer comprises a plurality of cholesteric layers configured to reflect UV radiation, and the plurality of cholesteric layers have different reflection maximums at UV wavelengths in the range between approximately 300 and 400 nm.

8. The pane construction according to claim 1, wherein the cholesteric layer comprises a mixture of a chiral component and a nematic component, the chiral component has a concentration of approximately 0.031 in molar fraction, the nematic component has a concentration of approximately 0.969 in molar fraction, and the wavelength of the reflection maximum is in the range from approximately 320 to 380 nm.

9. The pane construction according to claim 8, wherein the wavelength of the reflection maximum is at 350 nm.

10. The pane construction according to claim 1, wherein the UV reflecting layer is arranged between the IR reflecting layer and the electrochromic layer, the electrochromic layer adjoins the UV reflecting layer, the UV reflecting layer adjoins the IR reflecting layer, and the IR reflecting layer adjoins the outer pane.

11. The pane construction according to claim 1, wherein said laminate comprises a foil prepared before laminating of the whole pane construction, said foil being selected from the group consisting of:

a UV reflecting foil comprising the UV reflecting layer, an IR reflecting foil comprising the IR reflecting layer, an electrochromic foil comprising the electrochromic layer, a single combined IR and UV reflecting foil comprising the IR reflecting layer and the UV reflecting layer, a single combined IR reflecting and electrochromic foil comprising the IR reflecting layer and the electrochromic layer, a single combined UV reflecting and electrochromic foil comprising the UV reflecting layer and the electrochromic layer, and a single combined IR and UV reflecting and electrochromic foil comprising the IR reflecting layer, the UV reflecting layer and the electrochromic layer.

12. The pane construction according to claim 1, wherein the IR reflecting layer and/or the UV reflecting layer comprises at least one layered unit having a first cholesteric layer, a second cholesteric layer, and a $\lambda/2$ layer arranged between the first and second cholesteric layers, the $\lambda/2$ layer is configured to reverse the circular polarisation of the impinging IR or UV radiation, and the first and second cholesteric layers have equal pitch and/or equal handedness.

13. The pane construction according to claim 12, wherein the first and second cholesteric layers have the same pitch and the same handedness.

14. The pane construction according to claim 1, wherein said laminate comprises one or more cured cholesteric layers each comprising a cholesteric compound or a cholesteric mixture of compounds that are selected from the group consisting of:

at least one cholesteric polymerisable monomer;

at least one achiral, nematic polymerisable monomer and a chiral compound;

at least one cholesteric polymerisable polymer;

at least one cholesteric polymer in a polymerisable diluent;

at least one cholesteric polymer whose cholesteric face can be frozen in by rapid cooling to below the glass transition temperature; and at least one achiral liquid crystalline cross linkable polymer and a chiral compound.

15. The pane construction according to claim 1, wherein the IR reflecting layer comprises at least first to fourth cholesteric layers configured to reflect IR radiation, each of the first to fourth cholesteric layers comprises a chiral component and a nematic component, a concentration in molar fraction of the chiral component decreases from the first to fourth cholesteric layers, a concentration in molar fraction of the nematic component increases from the first to fourth cholesteric layers, and among the first to fourth cholesteric layers, the first cholesteric layer is closest to the outer pane and the fourth cholesteric layer is farthest from the outer pane.

* * * * *